Feb. 18, 1947.  P. B. SHAFFER  2,416,122

SPEED GOVERNOR

Filed Nov. 9, 1944

Inventor:
Paul B. Shaffer,
by Harry E. Dunham
His Attorney.

Patented Feb. 18, 1947

2,416,122

UNITED STATES PATENT OFFICE 2,416,122

SPEED GOVERNOR

Paul B. Shaffer, Fort Wayne, Ind., assignor to General Electric Company, a corporation of New York Application November 9, 1944, Serial No. 562,691

11 Claims. (Cl. 188—180)

My invention relates to speed governors and particularly to governors which are compact and may be used for controlling the speed of dynamoelectric machines.

An object of my invention is to provide an improved speed governor.

Another object of my invention is to provide an improved speed governor for a dynamoelectric machine formed of a simple laminated structure.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
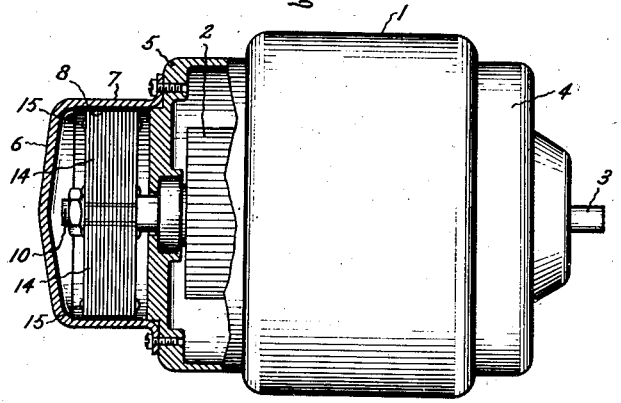
Figure 2:
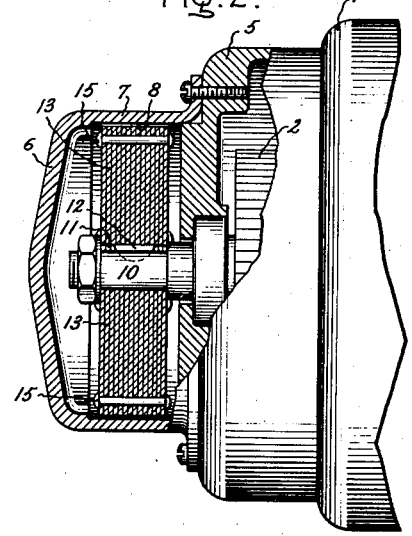
Figure 3:
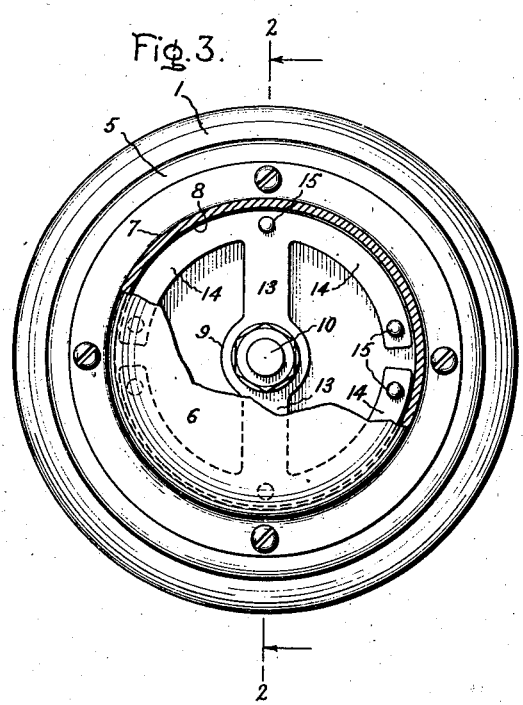

In the drawing, Fig. 1 is a side elevational view, partly broken away, of a motor provided with an embodiment of my invention; Fig. 2 is an enlarged view of the end of the construction shown in Fig. 1 with the speed-governing device shown in section taken along line 2—2 of Fig. 3; and Fig. 3 is an end view of the construction shown in Figs. 1 and 2, partly broken away to illustrate the construction of the speed-governing device.

Referring to the drawing, I have shown an embodiment of my invention applied to dynamoelectric machines having a stationary member 1 and a rotatable member 2 mounted on a shaft 3 supported in suitable bearings in the end shields 4 and 5 of the stationary member. In certain types of applications, it is necessary to provide a speed governor for limiting the speed of a motor to prevent its operation at destructively high speeds. My improved governor is applied to the shaft 3 of the motor and comprises a housing 6 formed with a cylindrical drum 7 with an internal friction braking surface 8 arranged about a rotatable member which is adapted to be mounted on the motor shaft 3 which extends into the housing 6. The rotatable member of the speed governor is formed of a plurality of laminations having a circular mounting hub portion 9 which fits over an end 10 of the shaft 3 and which is provided with a keyway 11 arranged in engagement with a key 12 mounted in a complementary keyway in the end 10 of the shaft for preventing relative rotation between the hub 9 and the shaft end 10. A plurality of supporting arms 13 extend in diametrically opposite directions from the mounting hub 9, and arcuate relatively flexible leg members 14 formed of the assembled laminated sheet metal members extend in each direction from adjacent the outer ends of the arms 13 providing a substantially rigid mounting for the legs. These legs 14 extending circumferentially in both directions from the arms 13 as shown in Fig. 3 and are formed with an arcuate outer surface on a radius slightly less than the radius of the drum frictional braking surface 8 for providing an air gap between the braking surface and the outer surface of the legs 14 when these legs are not rotated above a predetermined speed. The laminations which form the rotatable member of the speed governor are secured together in any suitable manner adjacent the ends of the arms 13, as by rivets 15, and also are secured together in any suitable manner adjacent the ends of the legs 14, as by rivets 15. This provides a relatively deformable flexible set of legs which will permit the rotatable member of the governor to rotate freely without interference with the speed of the driving rotatable device below a predetermined speed, and the rotatable member legs 14 will deflect under the action of centrifugal force above a predetermined speed for engaging the friction braking surface of the drum to provide a braking force on the rotatable member of the governor which will be transmitted to the driving shaft of the rotatable device on which the governor is mounted. Thus, if the speed of the motor in this instance exceeds a predetermined value, the legs 14 will deflect and engage the braking surface 8 of the housing 6 and will retard the speed of the rotatable member 2 of the motor. When this speed again reaches a predetermined safe operating value, the legs 14 of the governor rotatable member will be retracted out of engagement with the friction braking surface 8 and will permit the free rotation of the rotatable member of the motor 2.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A speed governor including a member having a friction braking surface, a rotatable member having deformable flexible arcuate circumferentially extending leg members formed of assembled laminations of sheet metal having such inherent characteristics and being arranged to provide an air gap between said leg members and said friction braking surface when not rotated above a predetermined speed and for frictionally engaging said friction braking surface above a predetermined speed by deflection thereof under the action of centrifugal force.

2. A speed governor including a housing having an internal friction braking surface, a rotatable member including supporting arms and deformable flexible arcuate leg members extending circumferentially in both directions from the outer ends of said arms and providing an air gap between said leg members and said friction braking surface when not rotated above a predetermined speed and for frictionally engaging said friction braking surface above a predetermined speed by deflection thereof under the action of centrifugal force.

3. A speed governor including a member having a friction braking surface, a rotatable member including a mounting hub with supporting arms extending therefrom, and means including deformable flexible arcuate leg members extending circumferentially in both directions from the outer ends of said arms and providing an air gap between said leg members and said friction braking surface when not rotated above a predetermined speed and for frictionally engaging said friction braking surface above a predetermined speed by deflection thereof under the action of centrifugal force.

4. A speed governor including a housing having a friction braking surface, a rotatable member including a mounting hub with supporting arms extending therefrom, and means including deformable flexible arcuate leg members extending circumferentially in each direction from adjacent the outer ends of said arms and providing an air gap between said leg members and said friction braking surface when not rotated above a predetermined speed and for frictionally engaging said friction braking surface above a predetermined speed by deflection thereof under the action of centrifugal force.

5. A speed governor including a member having an internal friction braking surface, a rotatable member including a mounting hub with supporting arms extending therefrom, and means including deformable flexible arcuate leg members extending circumferentially from adjacent the outer ends of said arms and providing an air gap between said leg members and said friction braking surface when not rotated above a predetermined speed and for frictionally engaging said friction braking surface above a predetermined speed by deflection thereof under the action of centrifugal force.

6. A speed governor including a housing having an internal friction braking surface, a rotatable member including supporting arms and deformable flexible arcuate leg members formed of assembled laminations of sheet metal extending in each direction from the outer ends of said arms and providing an air gap between said leg members and said friction braking surface when not rotated above a predetermined speed and for frictionally engaging said friction braking surface above a predetermined speed by deflection thereof under the action of centrifugal force.

7. A speed governor including a member having a friction braking surface, a rotatable member including a mounting hub with supporting arms extending therefrom, and means including deformable flexible arcuate leg members extending in each direction from the outer ends of said arms and having an outer surface formed on a radius slightly less than the radius of said drum friction braking surface for providing an air gap therebetween when not rotated above a predetermined speed and for frictionally engaging said friction braking surface above a predetermined speed by deflection thereof under the action of centrifugal force.

8. A speed governor including a housing having an internal friction braking surface, a rotatable member including supporting arms and deformable flexible arcuate leg members extending in each direction from adjacent the outer ends of said arms and having an outer surface formed on a radius slightly less than the radius of said drum friction braking surface for providing an air gap therebetween when not rotated above a predetermined speed for frictionally engaging said friction braking surface above a predetermined speed by deflection thereof under the action of centrifugal force.

9. A speed governor including a member having an internal friction braking surface, a rotatable member including supporting arms and deformable flexible arcuate leg members formed of assembled laminations of sheet metal extending in each direction from adjacent the outer ends of said arms and having an outer surface formed on a radius slightly less than the radius of said drum friction braking surface for providing an air gap therebetween when not rotated above a predetermined speed and for frictionally engaging said friction braking surface above a predetermined speed by deflection thereof under the action of centrifugal force.

10. A speed governor including a member having a friction braking surface, a rotatable member including a mounting hub with supporting arms extending therefrom, and means including deformable flexible arcuate leg members formed of assembled laminations of sheet metal extending in each direction from adjacent the outer ends of said arms and having an outer surface formed on a radius slightly less than the radius of said friction braking surface for providing an air gap therebetween when not rotated above a predetermined speed and for frictionally engaging said friction braking surface above a predetermined speed by deflection thereof under the action of centrifugal force.

11. A speed governor including a housing having a drum with an internal friction braking surface, a rotatable member adapted to be mounted on a rotatable device to be governed, said rotatable member including a mounting hub with supporting arms extending therefrom, and means including deformable flexible arcuate leg members formed of assembled laminations of sheet metal extending in each direction from adjacent the outer ends of said arms and having an outer surface formed on a radius slightly less than the radius of said drum friction braking surface for providing an air gap therebetween when not rotated above a predetermined speed and for frictionally engaging said friction braking surface above a predetermined speed by deflection thereof under the action of centrifugal force.

PAUL B. SHAFFER.

REFERENCES CITED

The following references are of record in the file of this patent:

UNITED STATES PATENTS

| Number | Name | Date |
|---|---|---|
| 1,600,346 | MacMurchy | Sept. 21, 1926 |
| 1,427,847 | Putt | Sept. 5, 1922 |
| 1,713,148 | Schild | May 14, 1929 |
| 1,847,764 | Kindl | Mar. 1, 1932 |
| 1,665,714 | Noble | Apr. 10, 1928 |
| 1,383,221 | Lombard | June 28, 1921 |

FOREIGN PATENTS

| Number | Country | Date |
|---|---|---|
| 78,314 | Swiss | Nov. 16, 1918 |